United States Patent [19]
Reynaud et al.

[11] Patent Number: 6,061,788
[45] Date of Patent: *May 9, 2000

[54] SYSTEM AND METHOD FOR INTELLIGENT AND RELIABLE BOOTING

[75] Inventors: Alan Reynaud, San Jose; Joe Nielson, Cupertino; Randy Han, San Jose; Tad Kuwano, Sunnyvale; James M. Worsham, Campbell; Wiliam J. Beyda, Cupertino, all of Calif.

[73] Assignee: Siemens Information and Communication Networks, Inc., Boca Raton, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/944,628

[22] Filed: Oct. 2, 1997

[51] Int. Cl.[7] .............................. G06F 9/445; G06F 11/00
[52] U.S. Cl. ................................. 713/2; 713/2; 713/100; 714/1; 714/2
[58] Field of Search ........................... 395/652, 180–184, 395/182.05, 182.11, 182.12, 182.2; 713/1, 2, 100; 714/1, 2, 7, 13, 14, 22

[56] References Cited

U.S. PATENT DOCUMENTS

| | | | |
|---|---|---|---|
| 5,274,816 | 12/1993 | Oka | 395/700 |
| 5,390,324 | 2/1995 | Burckhartt et al. | 395/575 |
| 5,564,054 | 10/1996 | Bramnick et al. | 395/700 |
| 5,596,711 | 1/1997 | Burckhartt et al. | 395/182.21 |
| 5,596,716 | 1/1997 | Byers et al. | 395/185.01 |
| 5,694,600 | 12/1997 | Khenson et al. | 395/652 |
| 5,708,776 | 1/1998 | Kikinis | 395/185.08 |
| 5,734,641 | 3/1998 | Kawasaki et al. | 370/242 |
| 5,805,882 | 9/1998 | Cooper et al. | 395/652 |

*Primary Examiner*—Ayaz R. Sheikh
*Assistant Examiner*—Tim Vo

[57] ABSTRACT

A system and method for intelligent and reliable booting of a PBX-supporting computer includes a system bus coupled to at least one central processor. Multiple booting devices are connected to the system bus including a hard disk drive, a removable media device, and at least one of RAM, NVRAM, and FLASHROM. Multiple monitoring devices are connected to the system bus to provide reliability data regarding each of the booting devices. A hierarchy of the booting devices is established, the order of which, in the absence of any system errors, is RAM, one of NVRAM and FLASHROM, the hard disk drive, and the removable media device. A power fail sensor detects power failures which have affected the system, and provides data regarding the reliability of RAM and the hard disk drive. A watchdog timer sensor detects errors in the operation of a central processor, and a memory status sensor detects memory checksum errors. Both the watchdog timer sensor and the memory status sensor provide reliability data regarding RAM, NVRAM and FLASHROM. A removable media error sensor provides reliability data regarding the removable media device. Based upon the data provided by the monitoring devices, the system selects the most reliable booting device from which to load an operating system program in to the main memory.

18 Claims, 4 Drawing Sheets

SYSTEM AND METHOD FOR INTELLIGENT AND RELIABLE BOOTING

BACKGROUND OF THE INVENTION

The invention relates to booting computers generally, and more specifically to a booting system and method which selects the most reliable device to boot a computer system.

DESCRIPTION OF THE RELATED ART

In computers generally, the main memory, which stores an operating system program during operation of the computer, is a volatile memory. That is, the main memory requires external electrical power to maintain its storage capability so that, when power to the computer is cut off for whatever reason, the programs in the main memory are erased. The main memory in a computer is typically random access memory, or RAM.

A computer might also be equipped with non-volatile data storage devices, such as non-volatile random access memory (NVRAM) and flash erasable read-only-memory (FLASHROM), both of which are similar to RAM except that NVRAM and FLASHROM are provided with a separate power source (i.e., a battery) so that they remain energized when external electrical power is unavailable. In addition, the computer contains magnetic media devices in the form of a hard disk drive and one or more floppy disk drives, each of which provides additional non-volatile data storage. Any one of these non-volatile storage devices may be used to store an operating system program.

Two situations arise which require transfer of the operating system program from non-volatile data storage to the main memory; first, when the computer is initially turned on, and second, when a malfunction in computer hardware or software causes the computer to become unresponsive to commands of a user. In both situations, the process by which the computer is placed into an operational state is called bootstrapping, or booting.

When the computer is initially turned on, a basic input-output system (BIOS) stored in a non-volatile memory such as FLASHROM is activated to invoke a series of system checks known as power-on self-tests (POST). The POST checks the integrity of basic hardware components such as the main memory, the keyboard, any disk drives, and other data storage devices. The hardware configuration is checked to determine whether it matches the hardware specification entered by the user. The hardware configuration includes the type of keyboard, the number and types of data storage devices, and the amount of main memory available. If the hardware is determined to be functioning properly and the hardware configuration matches the specification entered by the user, the next step is to load the operating system from one of the non-volatile data storage devices into the main memory.

Typically, in prior art methods, the particular storage device used to load the operating system is determined by a hierarchy based upon speed. Alternatively, the selection of a storage device from which to boot is determined simply by a default setting to a storage device perceived to be the most reliable, such as the hard disk. However, events which take place during the operation of a computer can impact the reliability of data storage devices as booting devices. For instance, a power failure can compromise data stored on a hard disk drive, or a central processor malfunction can indicate the presence of compromised data stored within the NVRAM or FLASHROM. Consequently, a method which employs a rigid selection hierarchy or a default selection method in determining which booting device to utilize does not take into account changed circumstances which might render a selection of a particular booting device inappropriate. For instance, the booting process which employs the default selection of a hard disk drive might not be selecting the most reliable booting device after a power failure.

What is needed is a system and method for reliable system booting which takes into account the reliability of the available booting devices based upon specific events which have taken place during operation of the system since the last successful boot cycle.

SUMMARY OF THE INVENTION

A system for intelligent and reliable booting includes a system bus connected to at least one central processor and to multiple booting devices including a hard disk drive, a removable media device, and at least one of RAM, NVRAM, and FLASHROM. Multiple monitoring devices connected to the system bus provide data to a selecting device regarding the reliability of each booting device. The monitoring devices may include a power fail sensor which provides data regarding the reliability of RAM and the hard disk drive, a watchdog timer sensor which monitors a central processor to detect operational errors and provides reliability data relevant to RAM, NVRAM, and FLASHROM, a memory status sensor which detects memory checksum errors and provides data on reliability of RAM, NVRAM, and FLASHROM, and a removable media error sensor that provides reliability data regarding a removable media device. The selecting device, responsive to the monitoring devices, selects which of the booting devices to utilize in booting the system based at least partially on data provided by the monitoring devices. An accessing device, responsive to the selection made by the selecting device, accesses the booting device to load an operating system into the main memory.

A method for intelligent and reliable system booting includes establishing a hierarchy of booting devices. In the absence of any errors, the order of the hierarchy comprises one of RAM, NVRAM, and FLASHROM, a hard disk drive, and a removable media device. The power fail sensor is examined to determine if a power failure has occurred since a last successful boot cycle. If no power failure has occurred, the system is booted from RAM. If a power failure has occurred, the watchdog timer sensor and the memory status sensor are checked to determine if either a central processor error or a memory checksum error has occurred. If neither a central processor error nor a memory checksum error has occurred and the system includes either NVRAM or FLASHROM, then the system is booted from either NVRAM or FLASHROM. If a power failure has occurred and either a central processor or memory checksum error has occurred, then the system is booted from the hard disk drive. The removable media sensor is examined to determine whether an error has occurred in the operation of the removable media device since the last successful booting cycle was completed. If no error has occurred, then a check is initiated using the removable media device to verify checksums of files on the hard disk drive used to boot the system. If an error has occurred in the operation of the removable media device, then a check is initiated with a service modem to verify checksums on the hard disk drive used in booting the system.

One aspect of the method provides a two-out-of-three voting system to ensure that the most reliable booting apparatus is chosen. After booting from RAM, a check is initiated by comparing checksums from booting files on the hard disk drive to corresponding checksums of booting files in RAM used to boot the system. If differences are found in the checksums and no error has occurred in the operation of the removable media device since the last successful booting cycle, then another check is performed comparing checksums of booting files from the removable media device to checksums of RAM booting files and hard disk drive booting files. If the checksums of the hard disk drive booting files and the removable media booting are in agreement, then the system is rebooted from the hard disk drive.

DETAILED DESCRIPTION

Figure 1:
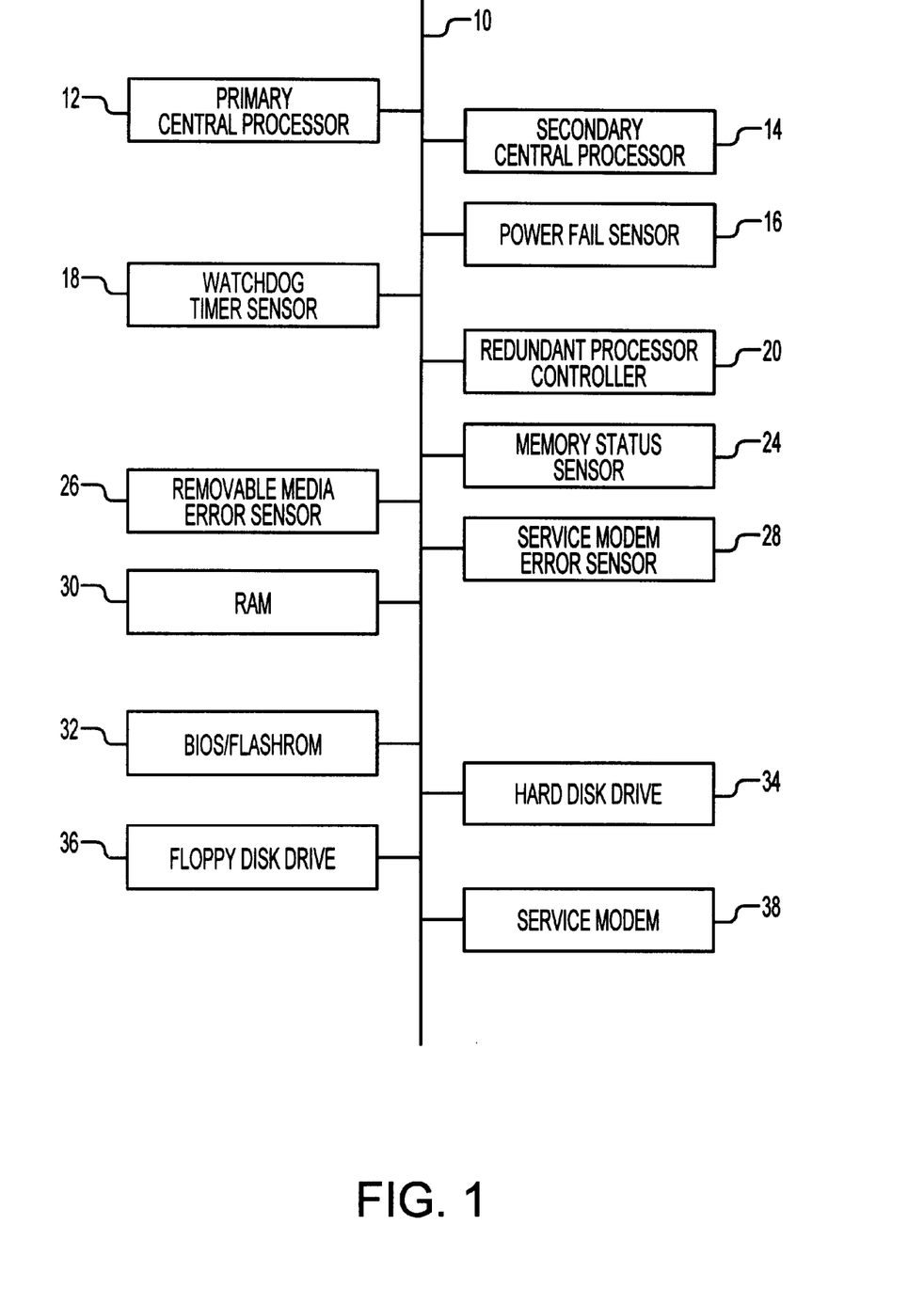
FIG. 1 is a block diagram of a booting system of the claimed invention.

FIG. 1 is a block diagram of a system for booting and operating a computer, such as a computer supporting a private branch exchange, or PBX. Although the system is preferably embodied in a PBX, the system can also be contained within a telecommunications system, a general purpose computing system, a server, or a messaging system. The system comprises a system bus 10 and components 12 through 38 coupled to the system bus 10. The components comprise a primary central processor 12 and a secondary central processor 14, a power fail sensor 16 to detect power failures affecting the system, and a watchdog timer sensor 18 to detect malfunctions in the operation of the primary central processor 12 or the secondary central processor 14. A redundant processor controller 20 cooperates with the watchdog timer sensor 18 in the event of a central processor malfunction to switch the system from the malfunctioning central processor to the functioning central processor. A memory status sensor 24 monitors a main memory, or RAM 30, and flash erasable read-only-memory (FLASHROM) 32, which contains a basic input/output system (BIOS) to detect any memory checksum errors during operation of the RAM and FLASHROM. A removable media error sensor 26 monitors a floppy disk drive 36 to detect errors which might occur during an operation of the floppy disk drive 36. While the embodiment of FIG. 1 includes a floppy disk drive, a compact disk read only memory (CD ROM) drive or a digital audio tape (DAT) drive or any such equivalent could be substituted without deviating from the present invention. Finally, a service modem error sensor 28 monitors a service modem 38 to detect errors in an operation of the service modem 38.

Two central processors, the primary central processor 12 and the secondary central processor 14, are preferably employed by the system. This redundancy provides backup for the PBX so that in case the primary central processor 12 malfunctions, the system can switch to the secondary central processor 14. The primary central processor communicates with a watchdog timer sensor 18 by transmitting signals to the watchdog timer sensor at regular intervals to indicate that the primary central processor is functioning properly. An absence of the signal in one of the intervals triggers a signal from the watchdog timer sensor that some malfunction has occurred in the operation of the primary central processor. A redundant processor controller 20 monitors and cooperates with the watchdog timer sensor 18 to switch the system to the secondary central processor 14, if the primary central processor 12 malfunctions.

During operation of the PBX-supporting computer, two different situations can arise which necessitate booting or rebooting the PBX-supporting computer. In the first situation, the computer is turned off by a user, or a power failure has occurred, and at some later time the computer is turned back on. At the point when the computer is turned back on, the computer must be booted before it can respond to commands from the user. Booting in this situation is referred to as a "cold boot." In the second situation, a hardware or software malfunction has occurred in the computer, and as a result the computer is no longer responsive to the commands of the user. Power to the computer is not turned off, but the computer must be rebooted before it will once again respond to user commands. Rebooting in this situation is termed a "warm boot." One significant difference between a warm boot and a cold boot is that a warm boot does not clear data stored in RAM. Consequently, RAM remains a potentially viable booting device for a warm boot, but not for a cold boot.

At the outset of booting the PBX-supporting computer, the primary central processor activates the BIOS stored in FLASH ROM 32 or in conventional ROM (not shown) to perform a series of power-on self-tests (POST). One aspect of the POST is the verification of the integrity of the various data storage devices which are capable of functioning as booting devices. The integrity verification is accomplished by consulting the various monitoring devices designed to detect malfunctions in the operation of the various booting devices. To determine the reliability of a particular booting device, the primary central processor 12 causes BIOS to transmit a query to a monitoring device which detects specific system operation errors that affect the reliability of the booting device in question. If the monitoring device responds by transmitting a TRUE logic value, this response indicates that the monitoring device has detected an operational error of the system during operation of the computer since the last successful boot cycle. A logic value of FALSE indicates that no error has occurred.

To determine the reliability of RAM 30 and the hard disk drive 34 as booting devices, the power fail sensor 16 is consulted to ascertain whether a power failure has occurred affecting the PBX-supporting computer during operation of the system since the last successful booting cycle was completed. In the case of RAM, the power failure causes data stored in RAM, to be lost. Thus, the booting files stored in RAM are no longer accessible after a power failure which affects the system. In the case of the hard disk drive 34, the power failure increases the possibility that a head might have crashed when the power failure occurred, thereby compromising data stored on the disk in the region of the disk where the head crash occurred. If booting files such as operating system files were stored adjacent to the crash site, then the hard disk drive can no longer be used to boot the computer. The increased possibility of such a head crash puts the reliability of the hard disk drive as a booting device into question.

The watchdog timer sensor 18 is consulted to determine whether a central processor error has occurred which would affect the reliability of the main memory, whether RAM 30, FLASHROM 32, or NVRAM, is utilized as the main memory. Although in FIG. 1 FLASHROM is employed as non-volatile memory, NVRAM can be substituted as an equivalent. As discussed above, the watchdog timer sensor monitors the operation of the primary central processor 12. A central processor error can be caused by corrupted data in the operating system file stored in RAM, or in FLASHROM or NVRAM if either is functioning as the main memory when the central processor error occurs. Consequently, the reliability of the main memory device is suspect as a booting device if a central processor error has taken place in the operation of the system since the last successful boot cycle. If the cause of the central processor malfunction is not corrupted data in the operating file, but is instead caused by a hardware malfunction of the primary central processor itself, then the redundant processor controller 20 will switch the system over to the secondary central processor so that the PBX can continue to function.

The memory status sensor 24 also provides reliability data regarding the main memory as a booting device by detecting memory checksum errors which have occurred during operation of the PBX-supporting computer since the last successful booting cycle. Checksum errors are recorded when the main memory accesses data improperly. That is, the data which was supposed to be accessed does not correspond precisely to the data actually accessed. If the memory status sensor detects a memory checksum error in any one of RAM 30, FLASHROM 32, or NVRAM, the reliability of the device generating the checksum error is questionable as a booting device.

The removable media error sensor 26 monitors the floppy disk drive 36 to detect errors in the operation of the floppy disk drive. An operational error in the floppy disk drive since the last successful boot cycle can indicate that the floppy disk drive is unreliable as a booting device. At least two different types of malfunctions can cause an error to be recorded by the removable media sensor. Data on a floppy disk might be corrupted or the floppy disk drive 36 might not be functioning properly. If floppy disk data corruption is the cause of the error recorded by the removable media error sensor, it is possible that the data was corrupted when the floppy disk received data from a separate floppy disk drive of the PBX-supporting computer or a floppy disk drive of another computer. This first type of malfunction is not likely to have affected the reliability of floppy disk drive 36 as a booting device. On the other hand, the floppy disk drive 36 itself might not be performing read/write operations correctly, in which case the floppy disk drive would not be a reliable booting device. In the preferred embodiment, if the removable media error sensor has recorded an error, a log of operations performed by the floppy disk drive is consulted to determine whether the error was caused by corrupted floppy disk data or by a malfunction of the floppy disk drive during a read/write operation. In this preferred embodiment, data from the removable media error sensor is more meaningfully analyzed.

A service modem 38 is included in the system as a fall-back device for booting the system and for verifying the reliability of other booting devices. The service modem is not a preferred device for either of these functions because the service modem operates at a substantially lower speed as a booting device than the other alternative booting devices. However, if none of the other booting devices are determined to be reliable, the central processor can cause the service modem to access the booting files from a remote site, either a support site provided by the manufacturer of the system or a private backup site of the user. The booting files can be downloaded from the remote site to be loaded onto the main memory of the PBX-supporting computer. This alternative, though not as fast as booting from the other alternative booting devices, is still preferable to relying on the availability of a service technician to return the PBX to an operational state.

As will be described more fully below with reference to FIGS. 3 and 4, the hard disk drive 34, the floppy disk drive 36, and the service modem 38, in addition to functioning as booting devices, can be utilized to verify the reliability of other booting devices. For example, if RAM 30 is utilized to boot the PBX-supporting computer during a warm boot, the possibility exists that some malfunctioning of RAM itself has required the system to be rebooted. Therefore, to ascertain the reliability of RAM, checksums of booting files from the hard disk drive can be compared to the corresponding checksums of booting files in RAM. The floppy disk drive and the service modem can be utilized in the same manner to verify the reliability of other booting devices.

Figure 2:
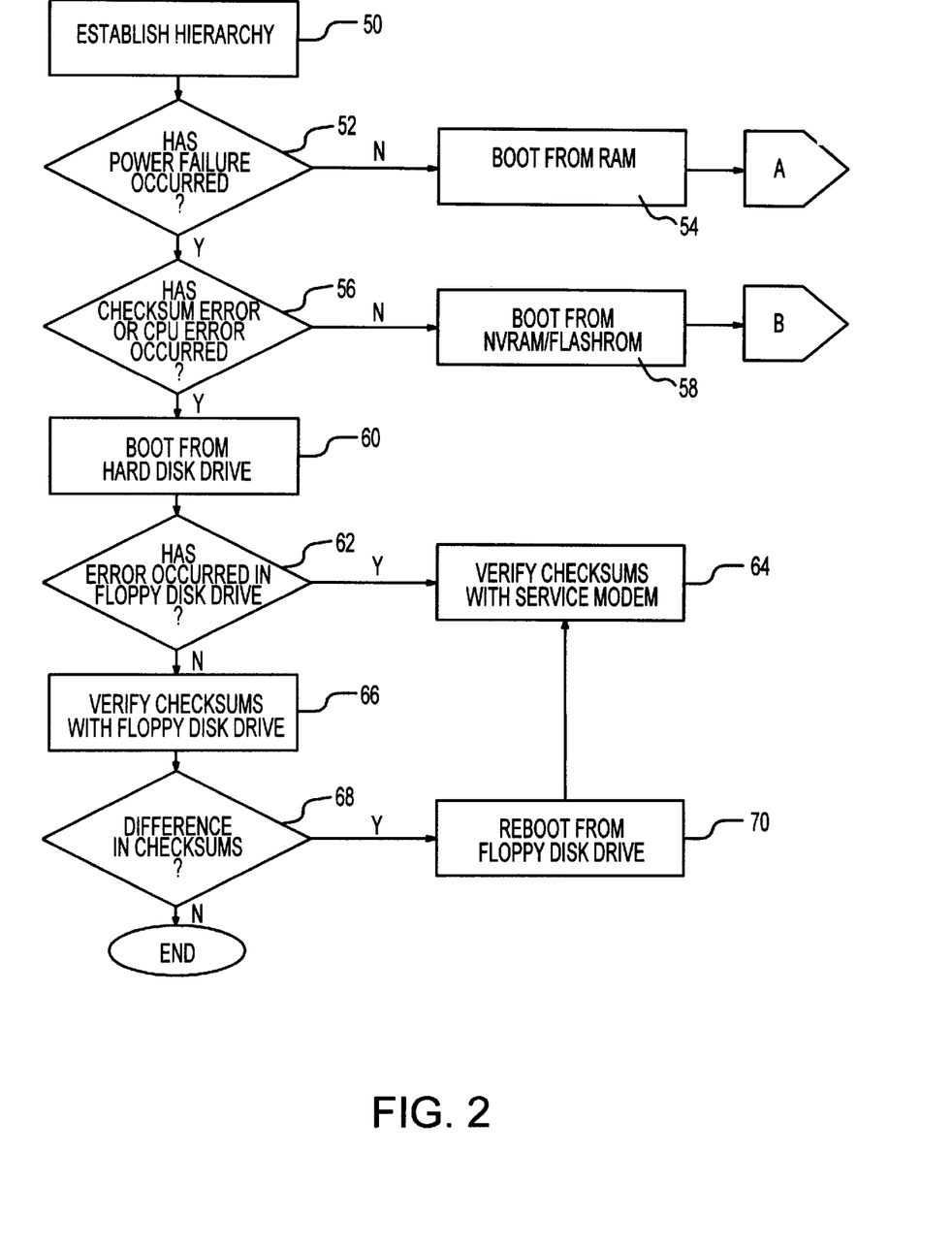
FIG. 2 is a process flow of the operation of the booting system shown in FIG. 1.

Turning now to FIG. 2, a method for booting a PBX-supporting computer according to the present invention is illustrated. In step 50, a priority hierarchy of alternative booting devices of the system illustrated in FIG. 1 is created. In the absence of any system errors, the order of the hierarchy is in descending order: RAM 30, one of FLASHROM 32 and NVRAM, the hard disk drive 34, the floppy disk drive 36, and the service modem 38. The order of the hierarchy is based primarily on the speed of the booting devices so that, in the absence of any system operational errors which might affect the reliability of the booting devices, the fastest booting device is selected.

The power fail sensor 16 is consulted to determine whether a power failure has occurred which affected the PBX-supporting computer. As discussed above, a power failure renders RAM 30 unreliable as a booting device, so that if the power fail sensor indicates that a power failure has occurred during an operation of the computer since the last successful boot cycle, the primary central processor directs BIOS to explore other alternative booting devices. If no power failure has occurred, then RAM is utilized to boot the computer as shown in step 54.

In step 56, a power failure has occurred, so the watchdog timer sensor and the memory status sensor are consulted to determine whether either a central processor error or a memory checksum error has occurred during operation of the computer since the last successful boot cycle. In a preferred embodiment either FLASHROM or NVRAM is utilized as non-volatile memory because it is unnecessary to employ both in a single PBX-supporting computer. FIG. 2 illustrates and the following discussion presupposes the use of either FLASHROM or NVRAM in the alternative. If a central processor error has occurred while either FLASHROM or NVRAM was functioning as the main memory for the computer, then as discussed above, signal processing within the booting process is continued under the assumption that corruption of operating system data stored in FLASHROM or NVRAM was responsible for the error. Likewise, if a memory checksum error is detected when data is being accessed from either FLASHROM or NVRAM, it is concluded that FLASHROM or NVRAM is not storing and/or retrieving data properly. Consequently, neither is considered reliable as a booting device. If neither a checksum error nor a central processor error has occurred since the last successful booting cycle, then in step 58 the PBX-supporting computer is booted from either FLASHROM or NVRAM.

In step 60, if both a power failure has occurred and either a memory checksum error or a central processor error has occurred during operation of the PBX-supporting computer since the last successful booting cycle, the computer is booted from the hard disk drive 34. As previously mentioned, however, a power failure creates a significant possibility that a read/write head associated with the hard disk drive has crashed, possibly corrupting data in booting files stored adjacent to the crash site. Consequently, it is desirable to verify the integrity of the booting files used to boot the PBX-supporting computer. To this end, the floppy disk drive 36 is employed as a booting reliability verification device. However, before the floppy disk drive can be utilized in this manner, the reliability of data stored on the floppy disk drive itself must first be verified in step 62. The floppy disk drive reliability verification is accomplished by consulting the removable media device error sensor 26 to determine if an error has occurred in the operation of the floppy disk drive since the last successful booting cycle. If no error has occurred, then in steps 66 and 68 checksums of booting files stored on the floppy disk drive 36 are compared to checksums of corresponding booting files stored on the hard disk drive to determine if any differences in the checksums exist. If differences are observed, the primary central processor 12 assumes that the data on the floppy disk drive is less likely to have been corrupted by the power failure than data on the hard disk drive. Consequently, the primary central processor directs the BIOS to reboot the PBX-supporting computer from the floppy disk drive in step 70. If no differences are found between the floppy disk drive checksums and the hard disk drive checksums, then no further steps are taken since the computer has already been booted, and the verification has established the reliability of the hard disk drive.

If in step 62 the removable media device indicates that an error has occurred in the operation of the floppy disk drive since the last successful booting cycle, the hard disk drive reliability verification is performed by the service modem 38 as shown in step 64. Furthermore, after the floppy disk drive has performed the booting in step 70, the service modem 38 can be used to verify the reliability of the floppy disk drive. The service modem calls a remote site in which booting files are stored and accessible to the service modem. The service modem can download either the booting files in their entirety or just the checksums of the booting files for comparison to the checksums of booting files on the hard disk drive. If the checksums from the hard disk drive and the service modem do not agree, the downloaded booting files can be used to boot the PBX-supporting computer. The service modem sensor 28 can be consulted to determine whether the service modem is reliable before utilizing the service modem either as a reliability verification device or as a booting device.

Utilizing RAM 30 as a booting device in step 52 can only occur during a warm boot, because in a cold boot power has been turned off from the PBX-supporting computer and, consequently, all data in RAM has been lost. However, even in a warm boot, there exists some question about the reliability of RAM as a booting device. The reliability questions are raised by the fact that some hardware or software malfunction has caused the computer to become unresponsive to commands of a user, and in the absence of data which verifies the integrity of RAM, it remains a possibility that corruption of RAM data is responsible for the malfunction of the PBX-supporting computer. A RAM operation log might be consulted prior to utilizing RAM as a booting device to determine if RAM is in fact responsible for the non-operational state of the computer which necessitates the warm booting. Additionally, the hard disk drive 34 and the floppy disk drive 36 can be utilized to verify the reliability of RAM.

Figure 3:
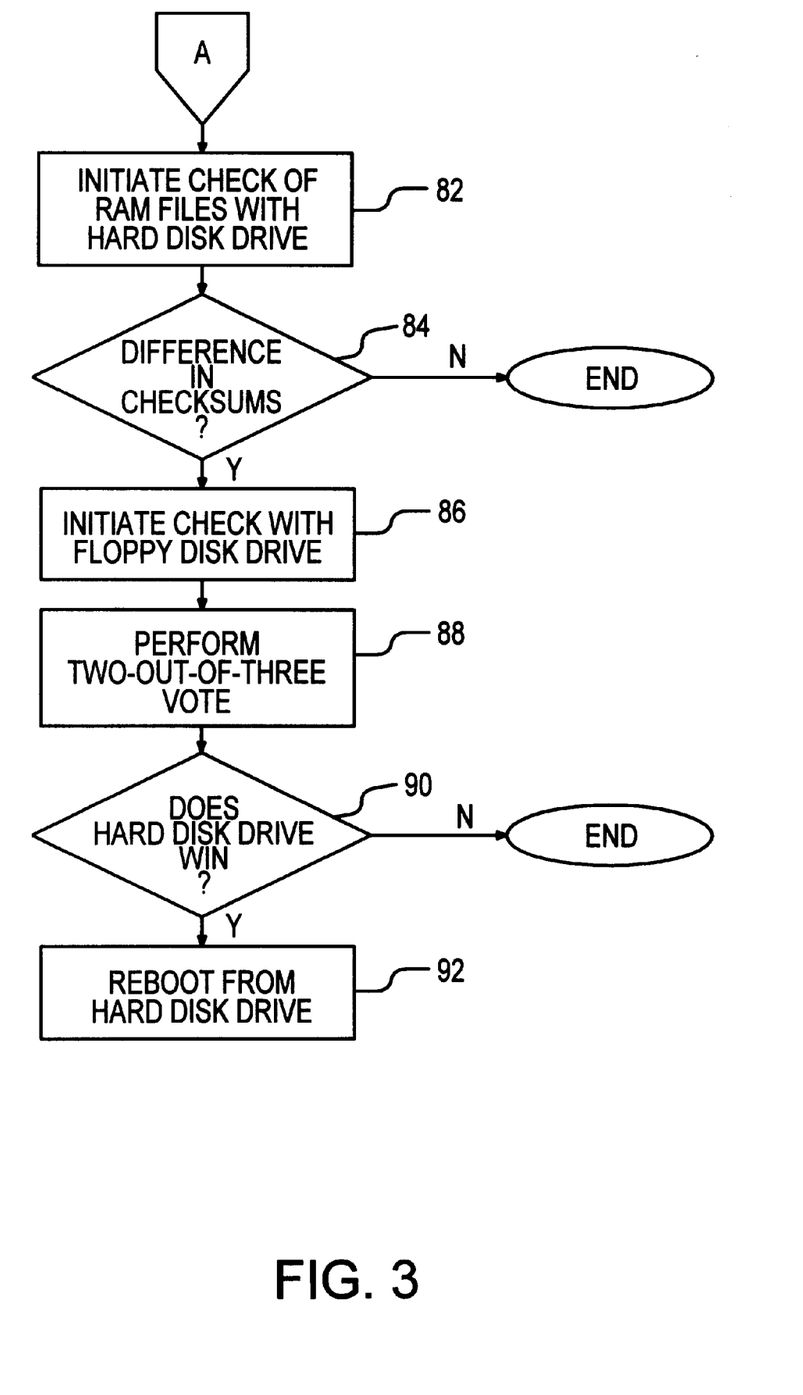
FIG. 3 is a process flow of a method for determining the reliability of RAM illustrated in the system of FIG. 1.

Referring to FIG. 3, a method for verifying the reliability of RAM as a booting device is illustrated. A check is initiated in step 82 using the hard disk drive 34 to verify checksums of booting files in RAM 30. In step 84, the checksums of booting files stored in the hard disk drive are compared with corresponding checksums of booting files in RAM. If no differences exist between the checksums of the hard disk drive booting files and the RAM booting files, then no further steps are taken because the PBX-supporting computer has been booted from RAM and the reliability of RAM has been established. On the other hand, if differences between the two checksums are found, a third check is initiated using the floppy disk drive 36 to verify checksums of booting files in RAM 30 and the hard disk drive 34 in step 86. In step 88, a two-out-of-three vote is taken by comparing the checksums of booting files of all three booting devices. If the floppy disk drive booting files checksums agree with the RAM booting files checksums, then no further steps are taken since the PBX-supporting computer has already been booted and RAM has been established as being reliable. If in step 90 the floppy disk drive booting file checksums agree with the hard disk drive booting file checksums, then in step 92 the system is rebooted from the hard disk drive. Rebooting from the hard disk drive occurs because the check establishes that RAM is unreliable, and because rebooting from the hard disk drive is faster than rebooting from the floppy disk drive.

Figure 4:
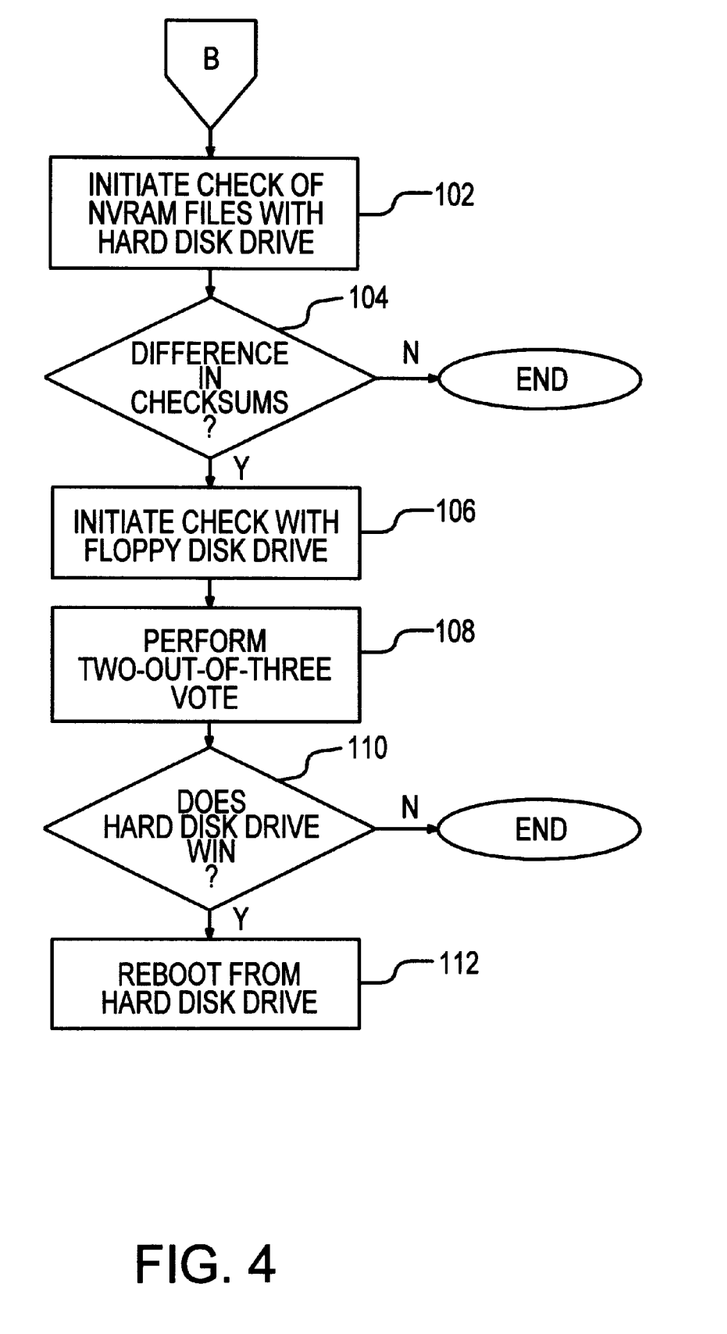
FIG. 4 is a process flow of a method for determining the reliability of NVRAM and FLASHROM illustrated in the system of FIG. 1.

FIG. 4 illustrates a similar reliability verification method as in FIG. 3, except that the verification is performed on NVRAM or FLASHROM. In step 102, after having booted the PBX-supporting computer with either NVRAM or FLASHROM, a check of either NVRAM or FLASHROM is initiated utilizing the hard disk drive. In step 104, checksums of booting files on the hard disk drive are compared to checksums in either NVRAM or FLASHROM. If no differences exist, then no further steps are taken. If differences are found, then, in step 106, a second check is initiated comparing checksums of booting files on the floppy disk drive with checksums of booting files in NVRAM or FLASHROM and on the hard disk drive. In step 108, a two-out-of-three vote is performed to determine whether the floppy disk drive checksums agree with the hard disk drive checksums or either of the NVRAM or FLASHROM checksums. In step 110, if the floppy disk drive checksums agree with the checksums of booting files in NVRAM or FLASHROM, then no further steps are taken. If, on the other hand, the floppy disk drive checksums agree with the hard disk drive checksums, then in step 112 the computer is rebooted from the hard disk drive. If the floppy disk drive is not available to perform the check, or if the removable media sensor 26 indicates that the floppy disk drive is unreliable, then the service modem 38 can be used in place of the floppy disk drive in the two-out-of-three vote process.

After the booting has been successfully completed, an entry is made into a log which describes the time at which the booting was performed, the specific devices used, and which specific operational errors were relevant to that selection. If a reboot is required within a predetermined time period, the decisions made in that booting process can be presumed wrong, and another alternative path may be attempted so as to avoid a repetition of the same errors. For instance, if RAM 30 was used to reboot the PBX-supporting computer and within ten minutes another reboot is required, it can be assumed that the booting files in RAM are compromised, and in a reboot RAM is not considered as a potential booting device.

The selection of a booting device based upon prior specific system operational errors which affect the reliability of particular booting devices as taught by the present invention avoids the selection of unreliable booting devices. Prior art systems which select a booting device based only on speed or based on a default setting for a device perceived to be most reliable are more susceptible to making an inappropriate selection when a system operational error affects the reliability of the selected booting device.

Although the preferred embodiment of the system and method is within a PBX-supporting computer, it is well suited for operation in other telecommunications systems, general purpose computing systems, servers, and messaging systems.

What is claimed is:

1. A system for intelligent and reliable booting comprising:
   a system bus;
   at least three alternative booting devices connected to said system bus, each of said booting devices being configured and connected to receive and store booting files, said alternative booting devices having an initialization hierarchy such that high speed booting devices have a higher priority than low speed booting devices, said high speed booting devices including a hard disk drive and said low speed booting devices including a removable media device;
   a plurality of monitoring devices connected to said system bus for determining reliability of said booting files stored in each of said booting devices, said reliability determination being based upon detection of specific system operational errors;
   means, communicatively connected and responsive to said monitoring devices, for preferentially selecting high priority booting devices based at least partially upon said initialization hierarchy and upon said detection of said specific system operation errors; and
   means, responsive to said selecting means, for accessing said booting files in said booting devices.

2. The system of claim 1 wherein said plurality of booting devices includes said hard disk drive, said removable media device and at least one of random access memory (RAM), non-volatile random access memory (NVRAM), and flash erasable read-only-memory (FLASHROM).

3. The system of claim 1 wherein said system bus, said booting devices, said monitoring devices, said selecting means, and said accessing means are each located in one of a private branch exchange (PBX), a telecommunications system, a general-purpose computing system, a messaging system, and a server.

4. The system of claim 2 wherein said plurality of monitoring devices includes a power fail sensor coupled to said system bus to detect power failures, said power fail sensor having an output of data to said selecting means relating to reliability of said booting files in said RAM and said hard disk drive, a watchdog timer sensor coupled to said system bus to detect malfunctions in said at least one central processor and a memory status sensor coupled to said system bus to detect memory checksum errors, said watchdog timer sensor and said memory status sensor each having an output of data to said selecting means relating to reliability of said at least one of said RAM, said NVRAM, and said FLASHROM, said monitoring devices further including a removable media error sensor to detect errors in an operation of said removable media device, said removable media error sensor having an output of data to said selecting means for determining reliability of said removable media device.

5. The system of claim 4 further comprising a service modem coupled to said system bus to enable access to booting files stored at a remote site, said selecting means being enabled to compare checksums of said booting files accessible to said service modem and checksums of said booting files stored on said hard disk drive and said removable media device to checksums of booting files stored in said at least one of RAM, NVRAM, and FLASHROM.

6. A method for intelligent and reliable booting of a system comprising the steps of:
   establishing a priority hierarchy of at least three alternative booting devices in each of which are stored booting files, said priority hierarchy being based upon relative speed of said alternative booting devices such that high speed booting devices are assigned a higher priority than low speed booting devices, said priority hierarchy of said booting devices having a descending order of (a) RAM, (b) one of NVRAM and FLASHROM, (c) a hard disk drive, and (d) a removable media device;
   monitoring said system by a plurality of monitoring devices to detect specific operational errors;
   determining a reliability of each of said alternative booting devices based upon operational error data of said system from said plurality of monitoring devices, said reliability being related to integrity of booting files stored in said alternative booting devices;
   selecting from said alternative booting devices a booting device highest in said hierarchy that is determined by at least one of said monitoring devices to be reliable; and
   booting said system with said selected booting device.

7. The method of claim 6 wherein said determining step utilizes said plurality of monitoring devices comprising a power fail sensor to detect power failures during operation of said system, said detection of said power failure in said system since a last successful booting cycle indicating unreliability of said RAM and said hard disk drive as booting devices, a watchdog timer sensor that detects central processor malfunctions in an operation of said central processor since said last successful booting cycle, and a memory status sensor that detects memory checksum errors which have occurred since said last successful booting cycle, said central processor malfunctions and said checksum errors indicating unreliability of said RAM, said one of NVRAM and FLASHROM, said plurality of monitoring devices further comprising a removable media error sensor that detects errors in an operation of said removable media device since said last successful booting cycle, said removable media device operational errors indicating unreliability of said removable media device.

8. The method of claim 6 wherein said determining step comprises the further steps of:
   ascertaining whether a power failure has occurred in an operation of said system since a last successful booting cycle; and
   if said power failure has occurred, ascertaining whether one of a central processor error and a memory checksum error has occurred in said operation of said system since said last successful booting cycle.

9. The method of claim 6 comprising the further steps of:
   creating a booting log describing at what time and with what specific steps said booting was completed; and
   if a reboot occurs within a predetermined time period, consulting said booting log to avoid repetition of said specific steps which failed at said time said booting was completed.

10. The method of claim 8 wherein said booting step includes:

if no power failure has occurred, booting from said RAM;

if said power failure has occurred and neither said central processor error nor said memory checksum error has occurred, booting from said one of NVRAM and FLASHROM; and if said power failure has occurred and said one of said central processor error and said memory checksum error has occurred, booting from said hard disk drive.

11. The method of claim 10 comprising the further steps of:

determining whether an error has occurred in an operation of said removable media device since said last successful booting cycle;

if no removable media device error has occurred, initiating a check utilizing said removable media device to verify checksums of said booting files in said hard disk drive used in booting said system; and if, in verifying said checksums of said booting files in said hard disk drive, differences between said hard disk drive checksums and said removable media device checksums are found, booting from said removable media device.

12. The method of claim 10 further comprising the steps of:

after booting from one of said RAM, said one of said NVRAM and said FLASHROM, initiating a check by comparing checksums of said booting files stored on said hard disk drive to corresponding checksums of said booting files in said one of said RAM and said one of NVRAM and FLASHROM used in booting said system; and if differences exist between said checksums of said booting files stored in said one of said RAM and said one of NVRAM and FLASHROM and said checksums of said booting files of said hard disk drive, and no error in said operation of said removable media device has occurred since said last successful booting cycle, initiating a check with said removable media device by comparing checksums of said booting files stored on said removable media device to said corresponding checksums of said booting files in said one of said RAM and said one of NVRAM and FLASHROM used in booting said system and to said corresponding checksums of said booting files stored in said hard disk drive.

13. The method of claim 11 comprising the further steps of:

if said error has occurred in said operation of said removable media device since said last successful booting cycle, initiating a check utilizing a service modem to verify checksums of said booting files on said hard disk drive used booting said system; and if, in verifying said checksums of said booting files in said hard disk drive, differences between said hard disk drive checksums and said service modem checksums are found, booting from said service modem.

14. The method of claim 12 comprising the further steps of:

selecting from a set of booting devices consisting of one of said RAM and said one of NVRAM and FLASHROM, said hard disk drive, and said removable media device, a booting device which is highest in said hierarchy and which has booting files with checksums that match checksums of booting files of one other booting device in said set; and if said hard disk drive is selected, rebooting said system from said hard disk drive.

15. A system for intelligent and reliable system booting comprising:

a system bus connected to at least one central processor;

at least four of booting devices coupled to said system bus comprising a hard disk drive, a removable media device, RAM, and at least one of NVRAM and FLASHROM;

a power fail sensor to detect power failures in said system, said detection of power failures during an operation of said system since a last successful booting indicating unreliability of said RAM and said hard disk drive as booting devices, said power fail sensor thereby being a first indicator of reliability of boot files available to said system;

a watchdog timer sensor to detect malfunctions in said at least one central processor, said detection of central processor malfunctions during an operation of said system since said last successful booting cycle indicating unreliability of said RAM and said one of NVRAM and FLASHROM as booting devices, said watchdog timer sensor thereby being a second indicator of reliability of boot files available to said system;

a memory status sensor to detect memory checksum errors, said detection of memory checksum errors during operation of said system since said last successful booting cycle indicating unreliability of said RAM and said one of NVRAM and FLASHROM, said memory status sensor thereby being a third indicator of reliability of boot files available to said system;

a removable media error sensor to detect errors in an operation of said removable media device, said errors in an operation of said removable media device during an operation of said system since said last successful booting cycle indicating unreliability of said removable media device as a booting source, said removable media error sensor thereby being a fourth indicator of reliability of boot files available to said system;

means connected to said system bus and responsive to all of said power fail sensor, said watchdog timer sensor, said memory status sensor, and said removable media error sensor for selecting which one of said at least four booting devices to utilize for each system booting process based at least partially on detection of specific system operational error, said means for selecting being configured to access said first, second, third and fourth indicators of reliability in selecting among said at least four booting devices; and means, responsive to selection from among said at least four booting devices by said selecting means, for accessing said selected one of said booting devices to load an operating system program into a main memory.

16. The system of claim 15 wherein said selecting means is enabled to compare checksums of booting files stored on said hard disk, booting files stored on said removable media, and booting files accessible to a service modem to checksums of corresponding booting files stored in said RAM, said one of NVRAM and FLASHROM, one of said RAM and said one of NVRAM and FLASHROM having been utilized to boot said system.

17. The system of claim 15 wherein said system bus, said plurality of booting devices, said power fail sensor, said watchdog timer sensor, said removable media sensor, said memory status sensor, said selecting means, and said accessing means are located in one of a PBX, a general-purpose computing system, a server, and a messaging system.

18. The system of claim 16 wherein said selecting means is enabled to compare checksums of files stored on said removable media device and files accessible to said service modem with checksums of corresponding files stored on said hard disk, said hard disk having been utilized to boot said system.

* * * * *

UNITED STATES PATENT AND TRADEMARK OFFICE
CERTIFICATE OF CORRECTION

PATENT NO.: 6,061,788
DATED: May 9, 2000
INVENTOR(S): Reynaud et al.

It is certified that error appears in the above-identified patent and that said Letters Patent is hereby corrected as shown below:

Title page item [75], line 4, please correct the sixth inventor's first name from "Wiliam" to --William--.

Signed and Sealed this

Twenty-second Day of May, 2001

*Attest:*

NICHOLAS P. GODICI

*Attesting Officer*   Acting Director of the United States Patent and Trademark Office